(12) United States Patent
Hong et al.

(10) Patent No.: US 6,395,397 B2
(45) Date of Patent: May 28, 2002

(54) ORGANIC ANTI-REFLECTIVE COATING POLYMER AND PREPARATION THEREOF

(75) Inventors: Sung-Eun Hong; Min-Ho Jung; Ki-Ho Baik, all of Gyunggi-do (KR)

(73) Assignee: Hyundai Electronics Industries Co., Ltd. (KR)

( * ) Notice: Subject to any disclaimer, the term of this patent is extended or adjusted under 35 U.S.C. 154(b) by 0 days.

(21) Appl. No.: 09/746,749

(22) Filed: Dec. 22, 2000

(30) Foreign Application Priority Data

Dec. 23, 1999 (KR) .............................. 99-61342

(51) Int. Cl.$^7$ .................. B32B 27/38; G03F 7/004; C08F 18/16; B05D 3/02
(52) U.S. Cl. ................. 428/413; 430/270.1; 430/271.1; 430/910; 526/273; 526/326; 526/329.7; 427/386; 427/96
(58) Field of Search ................ 428/413; 430/270.1, 430/271.1, 910; 427/386, 96; 526/273, 326, 329.7

(56) References Cited

U.S. PATENT DOCUMENTS

| | | | |
|---|---|---|---|
| 4,424,270 A | 1/1984 | Erdmann et al. | 430/166 |
| 4,822,718 A | 4/1989 | Latham et al. | 430/271 |
| 5,525,457 A | 6/1996 | Nemoto et al. | 430/325 |
| 5,674,648 A | 10/1997 | Brewer et al. | 430/18 |
| 6,309,790 B1 * | 10/2001 | Jung et al. | 430/270.1 |

FOREIGN PATENT DOCUMENTS

| | | |
|---|---|---|
| EP | 0 277 038 A3 | 8/1988 |
| EP | 0 277 038 A2 | 8/1988 |
| EP | 0 823 661 A1 | 2/1998 |
| WO | WO00/01752 | 1/2000 |

* cited by examiner

*Primary Examiner*—Robert Dawson
*Assistant Examiner*—Michael J Feely
(74) *Attorney, Agent, or Firm*—Townsend and Townsend and Crew LLP

(57) ABSTRACT

The present invention provides an anti-reflective coating polymer, an anti-reflective coating (ARC) composition comprising the same, methods for producing the same, and methods for using the same. The anti-reflective coating polymer of the present invention are particularly useful in a submicrolithographic process, for example, using ArF (193 nm) laser as a light source. The ARC of the present invention significantly reduces or prevents back reflection of light and the problem of the CD alteration caused by the diffracted and/or reflected light. The ARC of the present invention also significantly reduces or eliminates the standing wave effect and reflective notching. Thus, the use of ARC of the present invention results in formation of a stable ultrafine pattern that is suitable in manufacturing of 1G, and 4G DRAM semiconductor devices. Moreover, the ARC of the present invention significantly improves the production yield of such semiconductor devices.

35 Claims, No Drawings

ORGANIC ANTI-REFLECTIVE COATING POLYMER AND PREPARATION THEREOF

BACKGROUND OF THE INVENTION

1. Field of the Invention

The present invention relates to an anti-reflective polymer that is useful in a submicrolithographic process, a composition comprising the polymer, and a method for preparing the same. In particular, the present invention relates to a polymer that can be used in an anti-reflective coating layer to reduce or prevent back reflection of light and/or to eliminate the standing waves in the photoresist layer during a submicrolithographic process. The present invention also relates to a composition comprising the polymer, and a method for using the same.

2. Description of the Prior Art

In most submicrolithographic processes standing waves and/or reflective notching of the waves typically occur due to the optical properties of the lower layer coated on a substrate and/or due to changes in the thickness of a photosensitive (i.e., photoresist) film applied thereon. In addition, typical submicrolithographic processes suffer from a problem of CD (critical dimentional) alteration caused by diffracted and/or reflected light from the lower layer.

One possible solution is to apply an anti-reflective coating (i.e., ARC) between the substrate and the photosensitive film. Useful ARCs have a high absorbance of the light wavelengths that are used in submicrolithographic processes. ARCs can be an inorganic an organic material, and they are generally classified as "absorptive" or "interfering" depending on the mechanism. For a microlithographic process using I-line (365 nm wavelength) radiation, inorganic anti-reflective films are generally used. Typically, TiN or amorphous carbon (amorphous-C) materials are used for an absorptive ARC and SiON materials are typically used for an interfering ARC.

SiON-based anti-reflective films have also been adapted for submicrolithographic processes that use a KrF light source. Recently, use of an organic compound as ARC has been investigated. It is generally believed that an organic compound based ARCs are particularly useful in submicrolithographic processes, in particular those using an ArF light source.

In order to be useful as an ARC, an organic compound needs to have many diverse and desirable physical properties. For example, a cured ARC should not be soluble in solvents because dissolution of the organic ARC can cause the photoresist composition layer to peel-off in a lithographic process. One method for reducing the solubility of cured ARC is to include cross-linking moieties such that when cured the ARC becomes cross-linked and becomes insoluble in most solvents used in lithographic processes. In addition, there should be minimum amount of migration (i.e., diffusion), if at all, of materials, such as acids and/or amines, to and from the ARC. If acids migrate from the ARC to an unexposed area of the positive photoresist film, the photosensitive pattern is undercut. If bases, such as amines, diffuse from the ARC to an unexposed area of the positive photoresist film a footing phenomenon occurs. Moreover, ARC should have a faster etching rate than the upper photosensitive (i.e., photoresist) film to allow the etching process to be conducted smoothly with the photosensitive film serving as a mask. Preferably, an organic ARC should be as thin as possible and have an excellent light reflection prevention property.

While a variety of ARC materials are currently available, none of these materials is useful in ArF laser submicrolithographic processes. In the absence of an ARC, the irradiated light penetrates into the photoresist film and is back reflected or scattered from its lower layers or the surface of the substrate (e.g., semiconductor chip), which affects the resolution and/or the formation of a photoresist pattern.

Therefore, there is a need for an ARC material which have a high absorbance of the wavelengths used in submicrolithographic processes.

SUMMARY OF THE INVENTION

It is an object of the present invention to provide an organic polymer that can be used as an ARC material in ArF laser (193 nm) or KrF laser (248 nm) submicrolithographic processes.

It is another object of the present invention to provide a method for preparing an organic polymer that reduces or prevents diffusion and/or light reflection in submicrolithography processes.

It is a further object of the present invention to provide an ARC composition comprising such an organic diffusion/reflection preventing or reducing polymer and a method for producing the same.

It is a still further object of the present invention to provide a method for producing a photoresist pattern using ArF laser submicrolithographic processes with reduced standing wave effect.

It is yet another object of the present invention to provide a semiconductor device which is produced using the ARC composition in a submicrolithographic process.

DETAILED DESCRIPTION OF THE INVENTION

Alkyl groups according to the present invention are aliphatic hydrocarbons which can be straight or branched chain groups. Alkyl groups optionally can be substituted with one or more substituents, such as a halogen, alkenyl, alkynyl, aryl, hydroxy, amino, thio, alkoxy, carboxy, oxo or cycloalkyl. There may be optionally inserted along the alkyl group one or more oxygen, sulfur or substituted or unsubstituted nitrogen atoms. Exemplary alkyl groups include methyl, ethyl, i-propyl, n-butyl, t-butyl, fluoromethyl, difluoromethyl, trifluoromethyl, chloromethyl, trichloromethyl, and pentafluoroethyl.

In a submicrolithography process, an anti-reflective coating (i.e., ARC) is used to reduce or prevent the standing wave effect and/or reflective notching which can occur upon exposure of a photosensitive layer to light. In addition, the ARC reduces or eliminates the influence of a back diffraction and reflection of light from the lower layer. The ARC can also prevent undercutting and footing problems which can occur upon forming images on photosensitiveimaterials. To be useful, the ARC must have a high absorbance at specific wavelengths.

The present invention provides polymers that comprise a chromophore substituent which is highly absorptive of light, in particular at wavelengths of 193 nm and 248 nm. Polymers of the present invention can further comprise a crosslinking moiety. It has been found by the present inventors that the presence of such cross-linking moiety significantly improves the adhesiveness and dissolution of the ARC. Useful cross-linking moieties include an epoxide moiety. Without being bound by any theory, it is believed that heating (i.e., baking) ARC causes opening of the epoxide ring and creates crosslinking within the ARC polymer, thereby improving the physical properties of the ARC. In particular, uncured ARC resins (i.e., polymers) of the present invention are soluble in most hydrocarbon solvents, thus allowing ARC resins to be easily coated onto a substrate. However, a cured (i.e., baked) ARC of the present invention are relatively insoluble in most solvents, thus preventing dissolution of the ARC in a developing solution. It is believed that ARCs of the present invention have higher etching rate than ArF photosensitive films because the crosslinking moieties are bonded to each other via C—O linkages. This higher etching rate significantly improve is in the etch selection ratio between the ARC and the photosensitive film.

In one aspect of the present invention, an anti-reflective coating polymer is selected from the group consisting of a polymer of the formula:

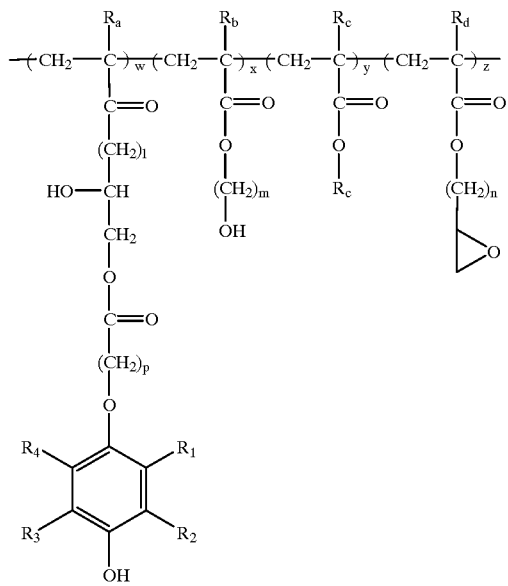

1

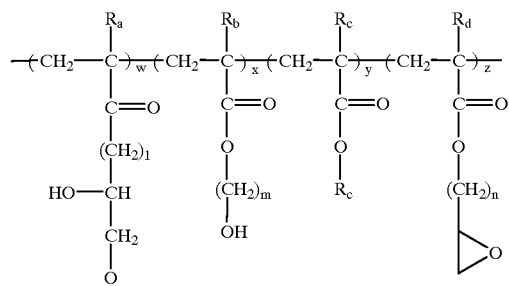

2

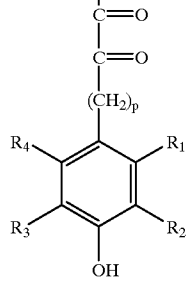

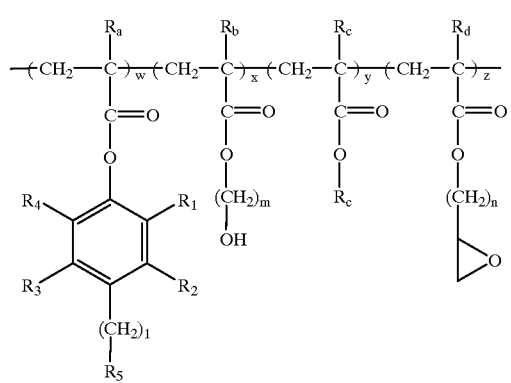

3 and mixtures thereof, wherein $R_a$, $R_b$, $R_c$, $R_d$, and $R_e$ are independently hydrogen or $C_1$–$C_6$ alkyl (preferably methyl);

$R_1$ to $R_4$ are independently hydrogen, optionally substituted $C_1$–$C_5$ alkyl, or optionally substituted alkoxyalkyl;

$R_5$ is hydrogen, hydroxide, a moiety of the formula —$COCH_3$, optionally substituted $C_1$–$C_4$ alkyl, optionally substituted cycloalky, optionally substituted alkoxyalky, or optionally substituted cycloalkoxyalkyl;

w, x, y and z are mole fractions each of which is independently in the range of from 0.1 to 0.9; and each of l, m, n, and p is independently an integer of 1 to 3.

The terminal groups of a polymer depicted in the present disclosure depend on the particular polymerization initiator used. In addition, as used throughout this disclosure, it should be appreciated that the order of monomeric units represented in a polymer formula does not necessarily indicate the actual order of such monomeric units in the polymer. Monomeric units represented in a polymer formula are intended to simply indicate the presence of such monomeric units in the polymer. Moreover, the variables represent the total relative ratio of each unit. For example, the total amount "w" in Formula 1 above can be inter dispersed throughout the polymer (not necessarily in same concentrations) or all or majority of such polymeric unit can be concentrated in one particular location of the polymer.

Another aspect of the present invention provides a method for producing an anti-reflective coating polymer, such as those described above.

In one particular embodiment of the present invention, the polymer of Formula 1 is produced by polymerizing a mixture of monomers comprising:

a 4-(4-hydroxyphenoxy)acetoxyalcoholacrylate monomer of the formula:

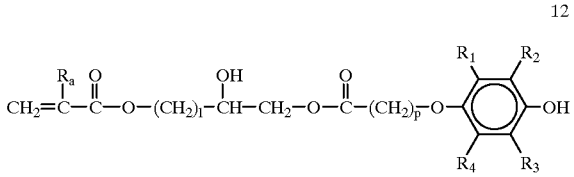

12 a hydroxyalkylacrylate monomer of the formula:

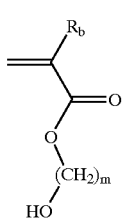

15 an alkylacrylate monomer of the formula:

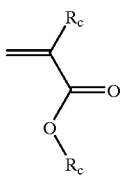

and a glycidylacrylate monomer of the formula:

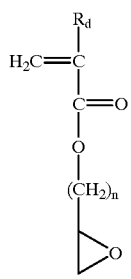

in the presence of a polymerization initiator, where $R_a$, $R_b$, $R_c$, $R_d$, $R_e$, $R_1$ to $R_4$, l, m, n and p are those defined above. Each of the monomers is present in a mole fraction ranging from about 0.1 to about 0.9.

Another embodiment of the present invention provides a method for producing the polymer of Formula 2 from a mixture of monomers comprising:

4-(4-hydroxyphenyl)pyruvicalcoholacrylate monomer of the formula:

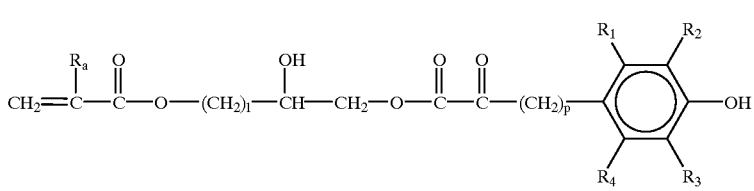

the hydroxy alkylacrylate monomer of Formula 15, the alkylacrylate monomer of Formula 16, and the glycidyl acrylate monomer of Formula 17 described above in the presence of a polymerization initiator, where $R_a$, $R_1$ to $R_4$, l, and p are those defined above. Each of the monomers is present in a mole fraction ranging from about 0.1 to about 0.9.

Yet another embodiment of the present invention provides a method for producing the polymer of Formula 3 from a mixture of monomers comprising:

a vinyl 4-benzoateketone monomer of the formula:

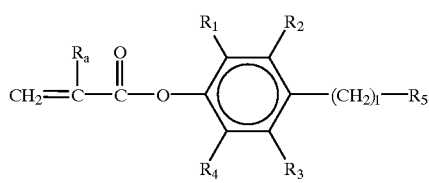

the hydroxy alkylacrylate monomer of Formula 15, the alkylacrylate monomer of Formula 16, and the glycidyl acrylate monomer of Formula 17 described above in the presence of a polymerization initiator, where $R_a$, $R_1$ to $R_5$, and l are those defined above. Each of the monomers is present in a mole fraction ranging from about 0.1 to about 0.9.

Preferably, mixtures of monomers described above further comprise an organic solvent. Useful organic solvents in polymerization are well known to one of ordinary skill in the art. In particular, a polymerization solvent is selected from the group consisting of tetrahydrofuran, toluene, benzene, methylethyl ketone, dioxane, and mixtures thereof.

Useful polymerization initiators include those well known to one of ordinary skill in the art, such as 2,2-azobisisobutyronitrile (AIBN), acetylperoxide, laurylperoxide and t-butylperoxide.

Preferably, the polymerization reaction is conducted at temperature in the range of from about 50° C. to about 80° C.

Another aspect of the present invention provides an ARC composition comprising a polymer the Formula 1, 2, 3, or mixtures thereof. It has been found by the present inventors that such an ARC composition is particularly useful in a submicrolithography process. The ARC composition can further include an organic solvent.

Still another aspect of the present invention provides a method for producing the ARC composition described above comprising the steps of admixing the ARC polymer described above with an organic solvent. Useful organic solvents for ARC composition include conventional organic solvent. Preferred organic solvents for ARC composition include ethyl 3-ethoxypropionate, methyl 3-methoxypropionate, cyclohexanone, propylene glycol methyletheracetate, and mixtures thereof. The amount of organic solvents for ARC composition is preferably in the amount of from about 200 to about 5,000% by weight relative to the total weight of the ARC polymers used.

Further aspect of the present invention provides a method for forming an ARC on a substrate. In one embodiment, the ARC compositing described above is coated on a substrate, such as a wafer, and the coated substrate is heated (e.g., baked). The ARC composition can be filtered prior to being coated onto the substrate. Heating of the coated substrate is preferably conducted at temperature in the range of from about 100° C. to about 300° C. for a period of from about 10 sec. to about 1,000 sec. Heating the coated substrate produces a film of crosslinked ARC polymer.

It has been found by the present inventors that the ARCs of the present invention exhibit high performance in submicrolithographic processes, in particular using KrF (248 nm), ArF (193 nm) and $F_2$ (157 nm) lasers as a light source.

In accordance with yet another aspect, the present invention provides a semiconductor device produced using the ARC composition described above.

Additional objects, advantages, and novel features of this invention will become apparent to those skilled in the art upon examination of the following examples thereof, which are not intended to be limiting.

EXAMPLE 1

Synthesis of 4-(4-Hydroxyphenoxy)acetoxy Isopropanol Methacrylate Monomer

To 100 g of tetrahydrofuran (THF) was added 0.35 moles of 4-hydroxyphenylacetic acid, a solution of 0.35 moles of p-toluene sulfonic acid in 100 g of THF, and 0.3 moles of glycidylmethacrylate (containing 0.03 moles of 4-methoxyphenyl as a polymerization inhibitor). The resulting solution was stirred for 24 hours under nitrogen atmosphere. During reaction progress was monitored using a thin layer chromatography (TLC). The reaction mixture was; washed with deionized water. The organic phase was extracted, dried over $MgSO_4$, and. distilled under vacuum to afford the title compound of Formula 4. Yield: 85–90%.

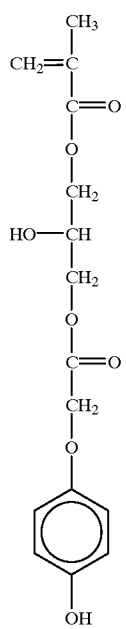

4

EXAMPLE 2

Synthesis of 4-(4,-Hydroxyphenyl) pyruvicisopropanol Methacrylate Monomer

To 100 g of tetrahydrofuran (THF) was added 0.35 moles of 4-hydroxyphenylpyruvic acid, a solution of 0.35 moles of p-toluene sulfonic acid in 100 g of THF, and 0.3 moles of glycidylmethacrylate (containing 0.03 moles of 4-methoxyphenyl as a polymerization inhibitor). The resulting solution was stirred for 10 hours or longer under nitrogen atmosphere. The reaction mixture was washed with deionized water, and the organic phase was extracted, dried over $MgSO_4$, and distilled under vacuum to afford the title compound of Formula 5. Yield: 80–85%.

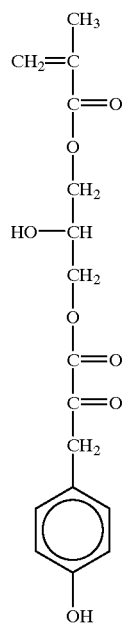

5

EXAMPLE 3
Synthesis of Vinyl 4-(2-Butanone)benzoate Monomer

To 0.35 moles of triethylamine was added 0.35 moles of 4-(4-hydroxyphenyl)-2-butanone and 0.33 moles of acryloylchloride. The resulting mixture was stirred for 24 hours or longer under nitrogen atmosphere while being cooled to maintain a constant temperature during the exothermic reaction. The reaction solution was neutralized with 1N sulfuric acid solution and washed with deionized water, and the organic phase was extracted, dried over $MgSO_4$ to afford the title compound of Formula 6. Yield: 90–95%.

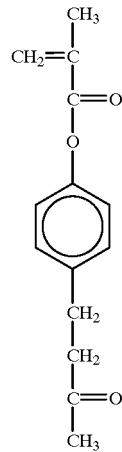

6

EXAMPLE 4
Synthesis of Vinyl 4-(3-Methoxy)benzoate Acetone Monomer

To 0.35 moles of triethylamine was added 0.35 moles of 4-hydroxy-3-methoxyphenylacetone and 0.33 moles of acryloylchloride. The resulting solution was stirred for 24 hours or longer under nitrogen atmosphere while being cooled to maintain a constant temperature during the exothermic reaction. The reaction mixture was neutralized with 1N sulfuric acid solution and washed with deionized water. after which the organic phase was extracted, dried over MgSO$_4$ to afford the title compound of Formula 7. Yield: 90–95%.

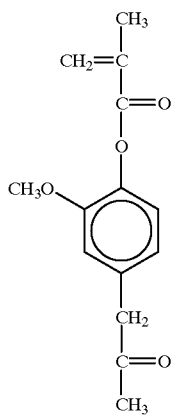

7

EXAMPLE 5

Synthesis of poly[4-(4 -Hydroxphenoxy) acetoxyisopropanolmethacrylate-hydroxyethylmethacrylate-methylmethacrylate-glycidylmethacrylate]quaternary Copolymer To a 500 ml round-bottom flask was added 0.3 moles of 4-(4-hydroxyphenoxy)acetoxyisopropahnolmethacrylate, 0.25 moles of hydroxyethylmethacrylate, 0.1 mole of methylmethacrylate, 0.3 moles of glycidylmethacrylate, 300 g of THF, and 0.1–3 g of 2,2'-azobisisobutyronitrile (AIBN). The resulting mixture was stirred at 60–75° C. for 5–20 hours under nitrogen atmosphere. The resulting solution was precipitated in ethyl ether or n-hexane and the precipitate was filtered and dried to afford poly[4-(4 -hydroxyphenoxy) acetoxyisopropanolmethacrylate-hydroxyethylmethacrylate-methylmethacrylate-glycidylmethacrylate]resin of Formula 8. Yield: 65–70%.

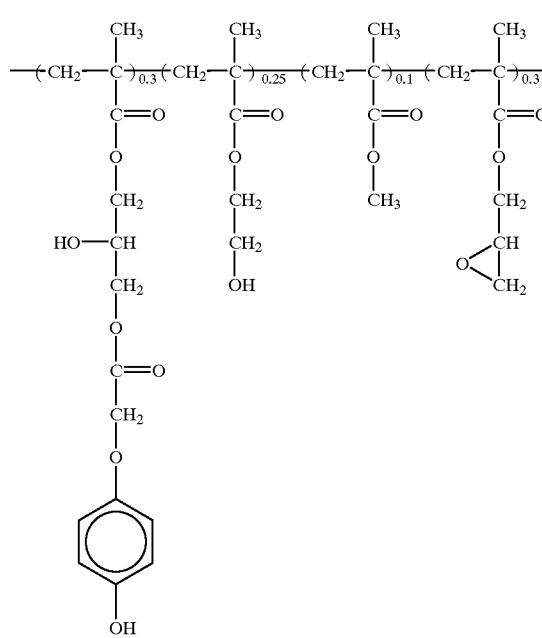

8

EXAMPLE 6

Synthesis of poly[4-(4 -Hydroxyphenyl) pyruvicisopropanolmethacrylate-hydroxyethylacrylate-methylmethacrylate-glycidylmethacrylate]quaternary Copolymer To a 500 ml round-bottom flask was added 0.3 moles of 4-(4-hydroxyphenyl)pyruvicisopropanolmethacrylate, 0.2 moles of hydroxyethylacrylate, 0.15 moles of methylmethacrylate, 0.3 moles of glycidylmethacrylate, 300 g of THF, and 0.1–3 g of AIBN. The resulting mixture was stirred at 60–75° C. for 5–20 hours under nitrogen atmosphere. The resulting solution was precipitated in ethyl ether or n-hexane. The precipitate was filtered and dried to afford poly[4-(4-hydroxyphenyl) pyruvicisopropanolmethacrylate-hydroxyethylacrylate-methylmethacrylate-glycidylmethacrylate]resin of Formula 9. Yield: 65–70%.

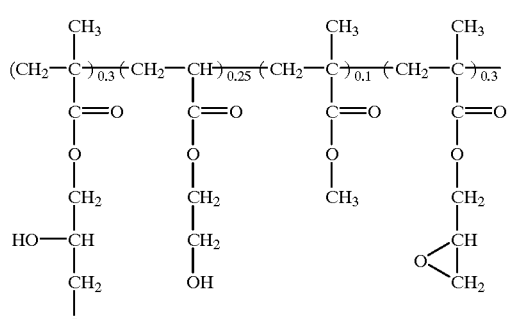

9

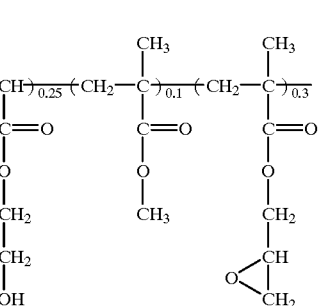

EXAMPLE 7

Synthesis of poly[Vinyl 4-(2 -Butanone)benzoate-hydroxypropylacrylate-methylmethacrylate-glycidylmethacrylate]quaternary Copolymer To a 500 ml round-bottom flask was added 0.3 moles of vinyl 4-(2-butanone)benzoate, 0.25 moles of hydroxypropylacrylate, 0.1 mole of methylmethacrylate, 0.3 moles of glycidylmethacrylate, 300 g of THF, and 0.1–3 g of AIBN. The reaction mixture was stirred at 60–75° C. for 5–20 hours under nitrogen atmosphere. The solution was precipitated in ethyl ether or n-hexane. The precipitate was filtered and dried to afford poly[vinyl 4-(2 -butanone) benzoate-hydroxypropylacrylate-methylmethacrylate-glycidylmethacrylate]resin of Formula 10. Yield: 65–70%.

10

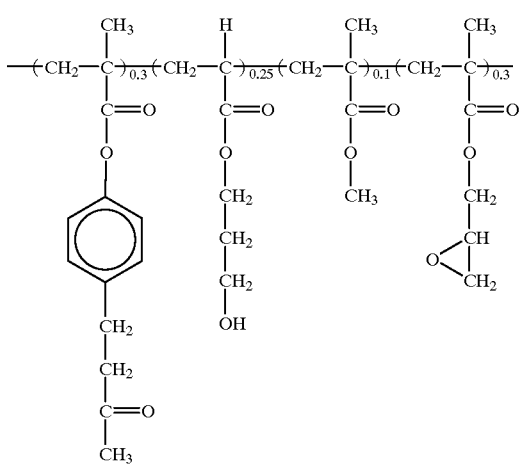

EXAMPLE 8

Synthesis of poly[Vinyl 4-(3 -Methoxy)
benzoateacetone-hydroxypropylmethacrylate-
methylmethyacrylate-glycidylmethacrylate]
quaternary Copolymer To a 500 ml round-bottom flask was added 0.3 moles of vinyl 4-(3-methoxy)benzoateacetone, 0.23 moles of hydroxypropylacrylate, 0.1 mole of methylmethacrylate, 0.3 moles of glycidylmethacrylate, 300 g of THF, and 0.1–3 g of AIBN. The resulting mixture was stirred at 60–75° C. for 5–20 hours under nitrogen atmosphere. The resulting solution was precipitated in ethyl ether or n-hexane and the precipitate was filtered and dried to afford poly[vinyl 4-(3 -methoxy)benzoateacetone-to hydroxypropylmethacrylate-methylmethacrylate-glycidylmethacrylate]resin of Formula 11. Yield: 65–70%.

11

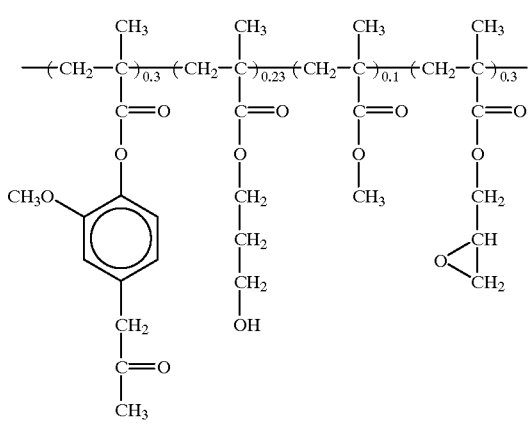

EXAMPLE 9

Formation of ARC

Polymers of Examples 5 to 8 were independently dissolved in propyleneglycol methylether acetate (PGMEA). These solutions, alone or in combination with 0.1–30% by weight of at least one additive selected from conventional anthracene additives. The resulting solutions were filtered, coated on a wafer, and hard-baked at 100–300° C. for 10–1,000 sec to form an ARC. A photosensitive material (i.e., photoresist composition) is coated on top of the ARC layer and subjected to a submicrolithographic process to produce an ultrafine photoresist pattern.

Polymers of the present invention comprise a phenyl group which is capable of absorbing light that is used in submicrolithography processes. Additionally, uncured polymer of the present invention is soluble in most hydrocarbon solvents while the cured (i.e., hard baked) polymer is insoluble in most solvents. Thus, polymers of the present invention can be easily coated onto a substrate and are capable of preventing undercutting and footing problems that can occur during a photoresist pattern formation on photosensitive materials (i.e., photoresist compositions).

Moreover, polymers of the present invention comprise crosslinking moieties that form C—O bonds, thus providing ARCs that have a higher etching rate than ArF photosensitive films resulting in a significantly improved etch selection ratio between the ARCs and the photosensitive films.

ARCs of the present invention reduce or eliminate the back reflection of light from lower layers of the photosensitive film or the surface of the substrate (e.g., semiconductor element). In addition, ARCs of the present invention reduce or eliminate the standing waves effect due to the thickness changes in the photoresist layer during a submicrolithographic process. Thus, ARCs of the present invention are useful in forming an ultrafine photoresist pattern. In particular, use of ARCs of the present invention in submicrolithographic processes result in formation of a stable ultrafine pattern that are suitable for 1G, 4G and 16G DRAM semiconductor devices. And since a stable pattern is formed, use of ARCs of the present invention greatly improves the production yield.

While the present invention has been described herein with reference to particular embodiments thereof, a latitude of modification, various changes and substitutions are intended in the foregoing disclosure. It will be appreciated that in some instances some features of the invention will be employed without a corresponding use of other features without departing from the scope of the invention as set forth herein. Therefore, many modifications may be made to adapt a particular situation or material to the teachings of the invention without departing from the essential scope and spirit of the present invention. It is intended that the invention not be limited to the particular embodiment disclosed as the best mode contemplated for carrying out this invention, but that the invention shall include all embodiments and equivalents falling within the scope of the appended claims.

What is claimed is:

1. A polymer of the formula:

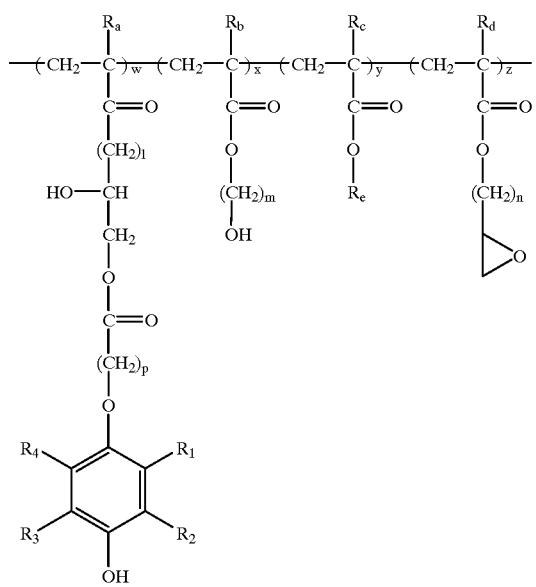

wherein
R$_a$, R$_b$, R$_c$, R$_d$, and R$_e$ are independently hydrogen or C$_1$–C$_6$ alkyl;
R$_1$ to R$_4$ are independently hydrogen, optionally substituted C$_1$–C$_5$ alkyl, or optionally substituted alkoxyalkyl;
w, x, y and z are mole fractions each of which is independently in the range of from 0.1 to 0.9; and
each of l, m, n and p is independently an integer of 1 to 3.

2. The polymer of claim 1, wherein R$_a$, R$_b$, R$_c$, R$_d$, and R$_e$ are methyl.

3. The polymer of claim 2, wherein l, n, and p are 1 and m is 2; R$_1$ to R$_4$ are hydrogen; w, x, y and z are in the ratio of 0.3:0.25:0.15:0.3.

4. A method for preparing a polymer of the formula:

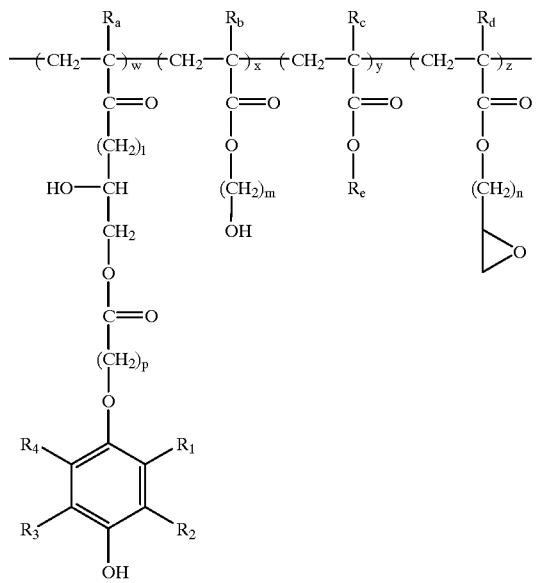

said method comprising the steps of polymerizing an admixture of monomers in the presence of a polymer initiator, wherein said admixture of monomers comprises:

a monomer of the formula:

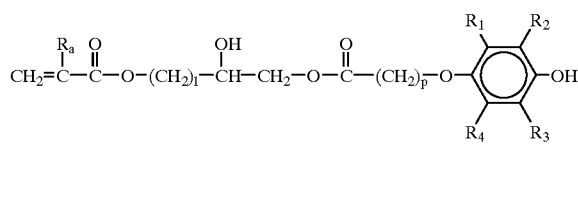

a hydroxyalkylacrylate monomer of the formula:

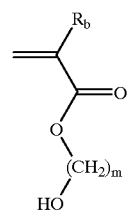

an alkylacrylate monomer of the formula:

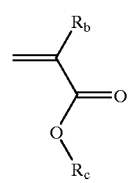

and a glycidylacrylate monomer of the formula:

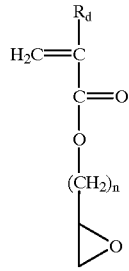

wherein
R$_a$, R$_b$, R$_c$, R$_d$, and R$_e$ are independently hydrogen or C$_1$–C$_6$ alkyl;
R$_1$ to R$_4$ are independently hydrogen, optionally substituted C$_1$–C$_5$ alkyl, or optionally substituted alkoxyalkyl; and
each of l, m, n and p is independently an integer of 1 to 3.

5. The method of claim 4, wherein said polymerization initiator is selected from the group consisting of 2,2-azobisisobutyronitrile(AIBN), acetylperoxide, laurylperoxide, and t-butylperoxide.

6. The method of claim 4, wherein said admixture further comprises a solvent.

7. The method of claim 6, wherein said solvent is selected from the group consisting of tetrahydrofuran, toluene, benzene, methylethyl ketone and dioxane.

8. The method of claim 4 further comprising heating said admixture to temperature in the range of from about 50° C. to about 80° C.

9. The method of claim 4, wherein the mole fraction of each of said monomers is independently in the range of from about 0.1 to about 0.9.

10. A polymer of the formula:

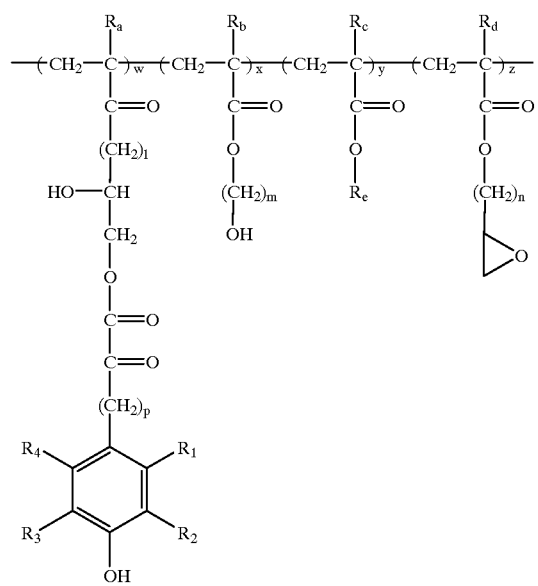

wherein $R_a$, $R_b$, $R_c$, $R_d$, and $R_e$ are independently hydrogen or alkyl;

$R_1$ to $R_4$ are independently hydrogen, optionally substituted $C_1$–$C_5$ alkyl, or optionally substituted alkoxyalkyl;

w, x, y and z are mole fractions each of which is independently in the range of from 0.1 to 0.9; and each of l, m, n and p is independently an integer of 1 to 3.

11. The polymer of claim 10, wherein $R_a$, $R_c$, $R_d$, and $R_e$ are methyl.

12. The polymer of claim 11, wherein $R_b$ is hydrogen; l, n and p are 1; m is 2; $R_1$ to $R_4$ are hydrogen; the ratio of w, x, y and z is 0.3:0.25:0.15:0.3.

13. A method for preparing a polymer of the formula:

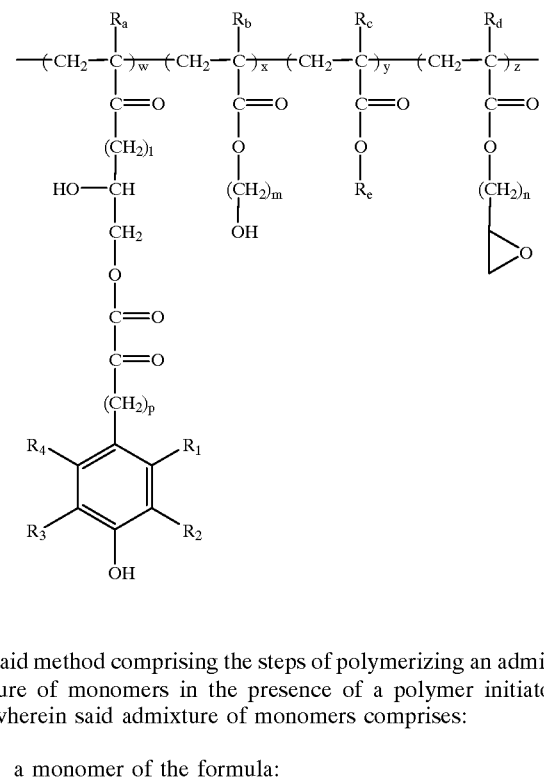

said method comprising the steps of polymerizing an admixture of monomers in the presence of a polymer initiator, wherein said admixture of monomers comprises:

a monomer of the formula:

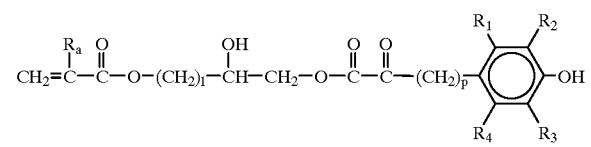

a hydroxyalkylacrylate monomer of the formula:

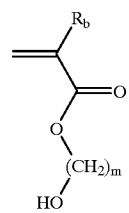

an alkylacrylate monomer of the formula:

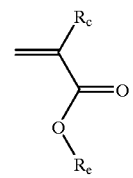

and a glycidylacrylate monomer of the formula:

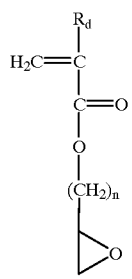

wherein $R_a$, $R_b$, $R_c$, $R_d$, and $R_e$ are independently hydrogen or $C_1$–$C_6$ alkyl;

$R_1$ to $R_4$ are independently hydrogen, optionally substituted $C_1$–$C_5$ alkyl, or optionally substituted alkoxyalkyl; and each of l, m, n and p is independently an integer of 1 to 3.

14. The method of claim 13, wherein said polymerization initiator is selected from the group consisting of 2,2-azobisisobutyronitrile(AIBN), acetylperoxide, laurylperoxide, and t-butylperoxide.

15. The method of claim 13, wherein said admixture further comprises a solvent.

16. The method of claim 15, wherein said solvent is selected from the group consisting of tetrahydrofuran, toluene, benzene, methylethyl ketone and dioxane.

17. The method of claim 13 further comprising heating said admixture to temperature in the range of from about 50° C. to about 80° C.

18. The method of claim 13, wherein the mole fraction of each of said monomers is independently in the range of from about 0.1 to about 0.9.

19. A polymer of the formula:

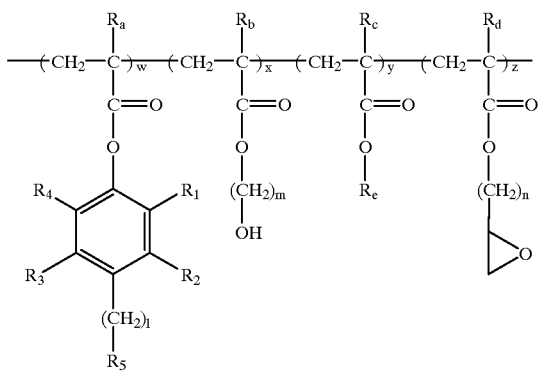

$R_a$, $R_b$, $R_c$, $R_d$, and $R_e$ are independently hydrogen or $C_1$–$C_6$ alkyl;

$R_1$ to $R_4$ are independently hydrogen, optionally substituted $C_1$–$C_5$ alkyl, or optionally substituted alkoxyalkyl;

$R_5$ is hydrogen, hydroxide, a moiety of the formula —$COCH_3$, optionally substituted $C_1$–$C_4$ alkyl, optionally substituted cycloalky, optionally substituted alkoxyalky, or optionally substituted cycloalkoxyalkyl;

w, x, y and z are mole fractions each of which is independently in the range of from 0.1 to 0.9; and each of l, m, and n is independently an integer of 1 to 3.

20. The polymer of claim 19, wherein $R_a$, $R_c$ and $R_d$ are methyl.

21. The polymer of claim 20, $R_b$ is hydrogen; l is 2; m is 3; n is 1; $R_1$ to $R_4$ are hydrogen; $R_5$ is a moiety of the formula —$COCH_3$; and the ratio of w, x, y and z is 0.3:0.25:0.15:0.3.

22. The polymer of claim 19, wherein $R_a$, $R_b$, $R_c$ and $R_d$ are methyl.

23. The polymer of claim 22, l is 1; m is 3; n is 1; $R_1$ to $R_3$ are hydrogen; $R_4$ is methoxy; $R_5$ is a moiety of the formula —$COCH_3$; and the ratio of w, x, y and z is 0.3:0.23:0.17:0.3.

24. A method for preparing a polymer of the formula:

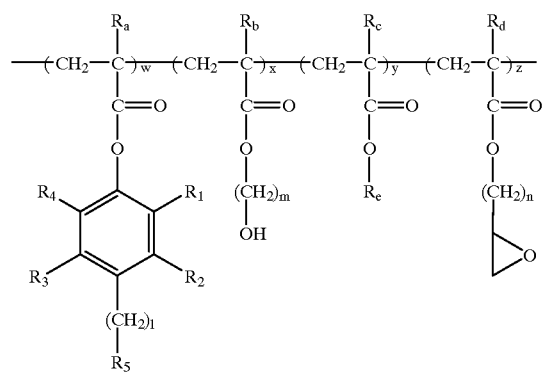

said method comprising the steps of polymerizing an admixture of monomers in the presence of a polymer initiator, wherein said admixture of monomers comprises:

a monomer of the formula:

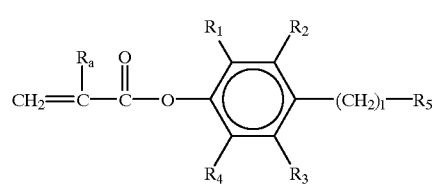

a hydroxyalkylacrylate monomer of the formula:

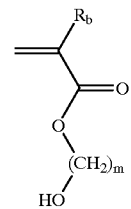

an alkylacrylate monomer of the formula:

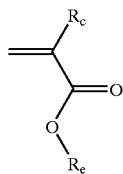

and a glycidylacrylate monomer of the formula:

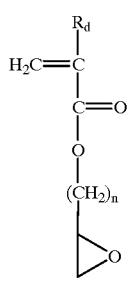

wherein $R_a$, $R_b$, $R_c$, $R_d$, and $R_e$ are independently hydrogen or $C_1$–$C_6$ alkyl;

$R_1$ to $R_4$ are independently hydrogen, optionally substituted $C_1$–$C_5$ alkyl, or optionally substituted alkoxyalkyl;

$R_5$ is hydrogen, hydroxide, a moiety of the formula —COCH$_3$, optionally substituted $C_1$–$C_4$ alkyl, optionally substituted cycloalky, optionally substituted alkoxyalky, or optionally substituted cycloalkoxyalkyl; and each of l, m, and n is independently an integer of 1 to 3.

25. The method of claim 24, wherein said polymerization initiator is selected from the group consisting of 2,2-azobisisobutyronitrile(AIBN), acetylperoxide, laurylperoxide, and t-butylperoxide.

26. The method of claim 24, wherein said admixture further comprises a solvent.

27. The method of claim 26, wherein said solvent is selected from the group consisting of tetrahydrofuran, toluene, benzene, methylethyl ketone and dioxane.

28. The method of claim 24 further comprising heating said admixture to temperature in the range of from about 50° C. to about 80° C.

29. The method of claim 24, wherein the mole fraction of each of said monomers is independently in the range of from about 0.1 to about 0.9.

30. A method for forming an anti-reflective coating on a substrate, said method comprising the steps of:

(a) admixing an organic solvent and an anti-reflective coating polymer selected from the group consisting of a polymer of the formulas:

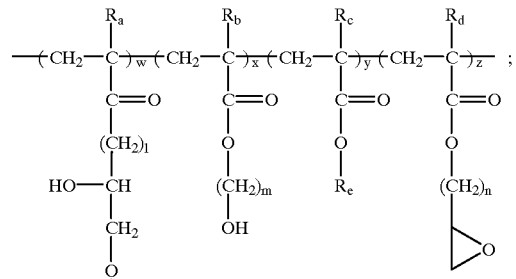

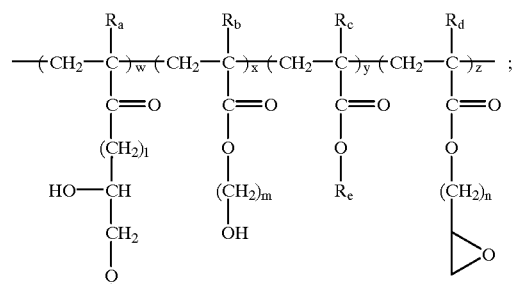

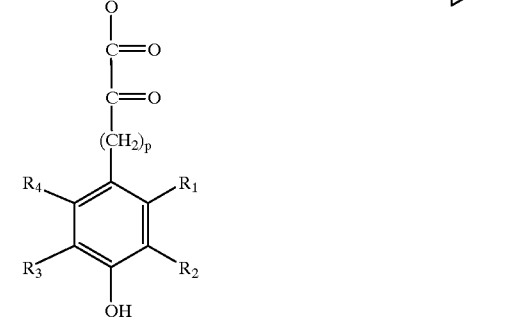

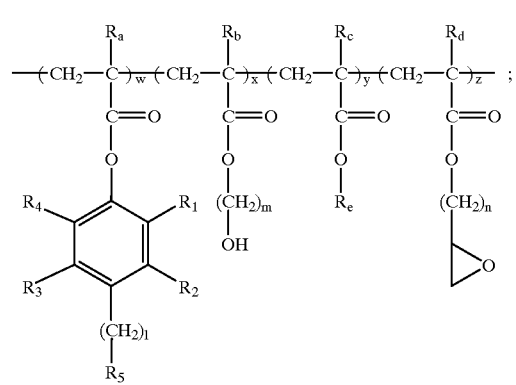

and mixtures thereof,
wherein
R$_a$, R$_b$, R$_c$, R$_d$, and R$_e$ are independently hydrogen or C$_1$–C6 alkyl;
R$_1$ to R$_4$ are independently hydrogen, optionally substituted C$_1$–C$_5$ alkyl, or optionally substituted alkoxyalkyl;
R$_5$ is hydrogen, hydroxide, a moiety of the formula —COCH$_3$, optionally substituted C$_1$–C$_4$ alkyl, optionally substituted cycloalky, optionally substituted alkoxyalky, or optionally substituted cycloalkoxyalkyl;
w, x, y and z are mole fractions each of which is independently in the range of from 0.1 to 0.9; and
each of l, m, n, and p is independently an integer of 1 to 3, (b) coating said admixture on a substrate; and
(c) heating said coated substrate.

31. The method of claim 30, wherein said organic solvent is selected from the group consisting of ethyl 3-ethoxypropionate, methyl 3-methoxypropionate, cyclohexanone, and propylene glycol methyletheracetate.

32. The method of claim 30, wherein the amount of said organic solvent is from about 200 to about 5,000% by weight of the total weight of said anti-reflective coating polymers.

33. The method of claim 30, wherein said heating step comprises heating said coated substrate at temperature in the range of from about 100° C. to about 300° C. for a period of from about 10 sec. to about 1,000 sec.

34. A semiconductor device produced by a method of claim 30.

35. An anti-reflective coating composition, comprising a polymer of the formulas:

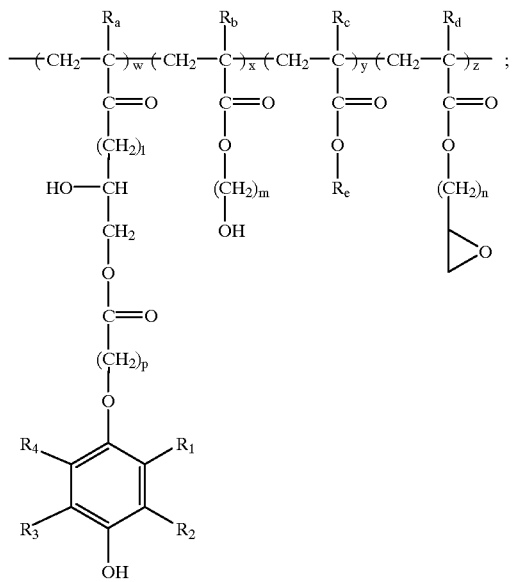

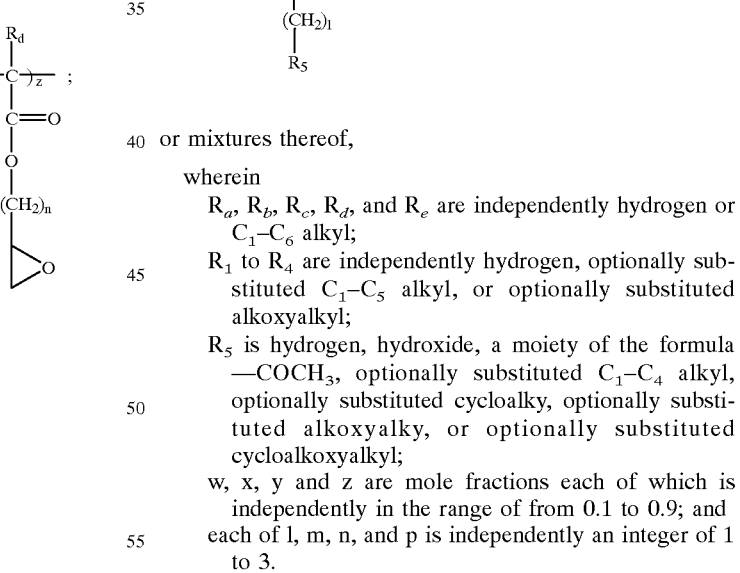

or mixtures thereof,
wherein
R$_a$, R$_b$, R$_c$, R$_d$, and R$_e$ are independently hydrogen or C$_1$–C$_6$ alkyl;
R$_1$ to R$_4$ are independently hydrogen, optionally substituted C$_1$–C$_5$ alkyl, or optionally substituted alkoxyalkyl;
R$_5$ is hydrogen, hydroxide, a moiety of the formula —COCH$_3$, optionally substituted C$_1$–C$_4$ alkyl, optionally substituted cycloalky, optionally substituted alkoxyalky, or optionally substituted cycloalkoxyalkyl;
w, x, y and z are mole fractions each of which is independently in the range of from 0.1 to 0.9; and
each of l, m, n, and p is independently an integer of 1 to 3.

* * * * *

UNITED STATES PATENT AND TRADEMARK OFFICE
CERTIFICATE OF CORRECTION

PATENT NO.    : 6,395,397 B2
DATED         : May 28, 2002
INVENTOR(S)   : Sung-Eun Hong, Min-Ho Jung and Ki-Ho Baik It is certified that error appears in the above-identified patent and that said Letters Patent is hereby corrected as shown below:

Column 2,
Lines 13-14, the term "submicrolithography" should read -- submicrolithographic --.
Line 44, the phrase "photosensitiveimaterials." should read
-- photosensitive materials. --.
Line 66, the phrase "improve is" should read -- improves --.

Column 3,
Lines 4-66, please replace Chemical Formulas 1, 2, and 3 with the following formulas:

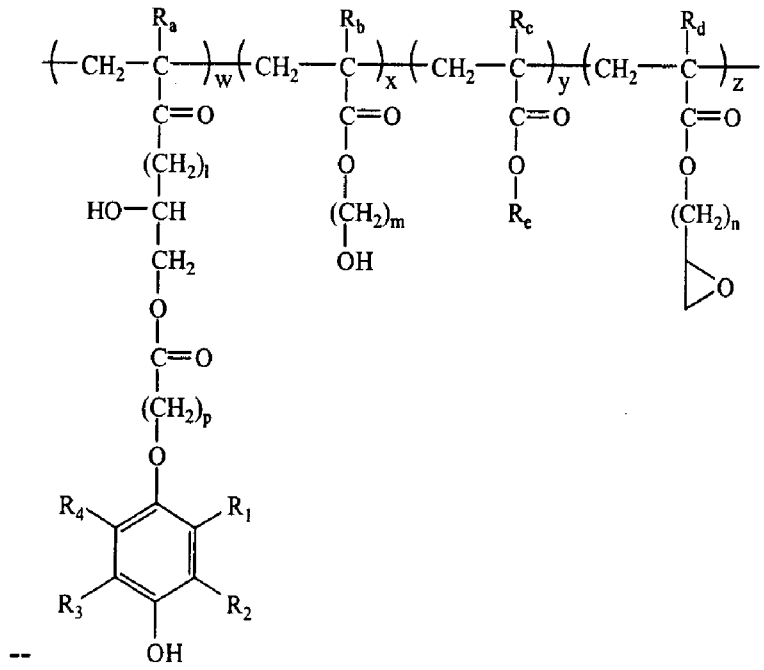

UNITED STATES PATENT AND TRADEMARK OFFICE
CERTIFICATE OF CORRECTION

PATENT NO. : 6,395,397 B2
DATED : May 28, 2002
INVENTOR(S) : Sung-Eun Hong, Min-Ho Jung and Ki-Ho Baik It is certified that error appears in the above-identified patent and that said Letters Patent is hereby corrected as shown below:

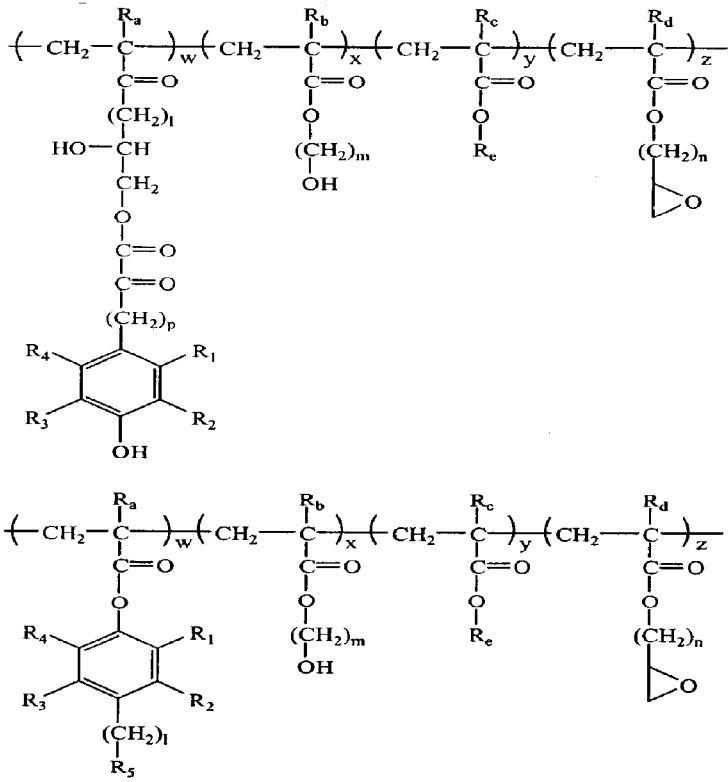

--.

Column 5,
Lines 2-12, please replace Chemical Formula 16 with the following formula:

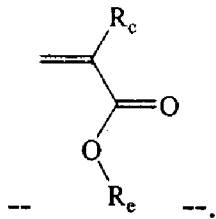

-- --.

Column 7,
Line 20, the term "was;" should read -- was --.
Line 22, the term "and." should read -- and --.

UNITED STATES PATENT AND TRADEMARK OFFICE
CERTIFICATE OF CORRECTION

PATENT NO.    : 6,395,397 B2
DATED         : May 28, 2002
INVENTOR(S)   : Sung-Eun Hong, Min-Ho Jung and Ki-Ho Baik It is certified that error appears in the above-identified patent and that said Letters Patent is hereby corrected as shown below:

Column 14,
Lines 30-40, please replace the alkylacrylate monomer of the formula with the following formula:

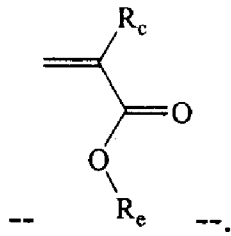

Signed and Sealed this

Twelfth Day of August, 2003

JAMES E. ROGAN
*Director of the United States Patent and Trademark Office*